Feb. 11, 1964 B. MALONEY 3,120,882
BRAKE ROTOR
Filed May 31, 1962
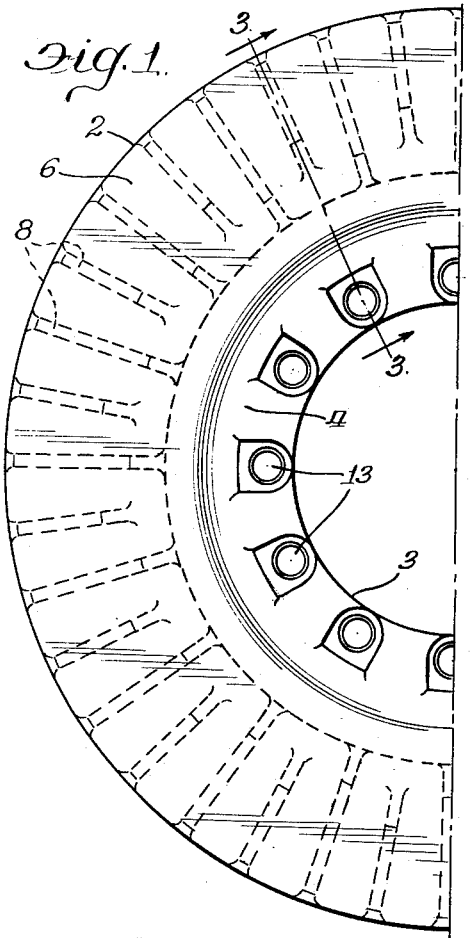
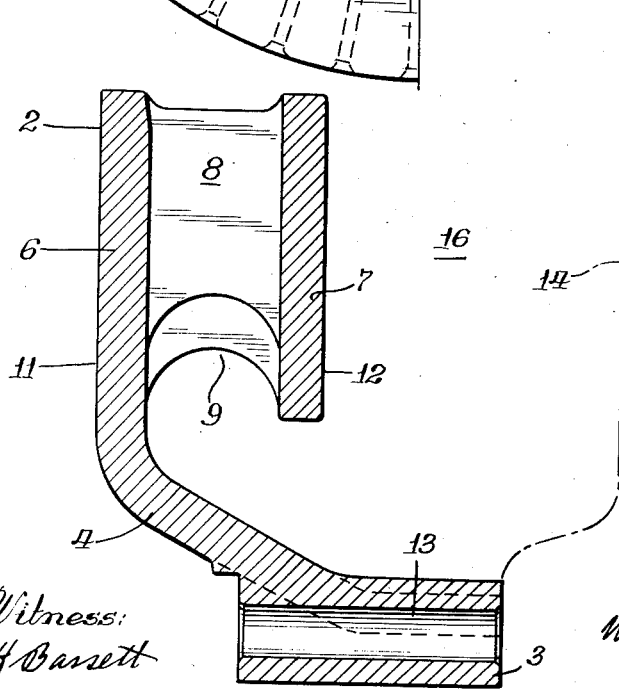
INVENTOR.
Bernard Maloney
BY
Walter F. Schlegel Jr.
Atty.
Witness:
C.H. Barrett

United States Patent Office 3,120,882
Patented Feb. 11, 1964

3,120,882
BRAKE ROTOR
Bernard Maloney, Hammond, Ind., assignor to Amsted Industries Incorporated, Chicago, Ill., a corporation of New Jersey
Filed May 31, 1962, Ser. No. 199,033
3 Claims. (Cl. 188—218)

This invention relates to railway car brakes and more particularly to a brake rotor for an off-wheel brake arrangement in which the rotor is frictionally engaged between a pair of brake shoes during decleration of a railway car.

During the application of the brake shoes aginst a conventional cast iron rotor to decelerate a railway car, the rotor may be heated to a temperature which causes excessive thermal stressing of the metal and resultant damage to the rotor. Therefore, cast iron brake rotors have heretofore been formed with various types of circumferentially spaced radial blades between spaced friction plates to define passages for the flow of cooling air to dissipate a portion of the heat generated during frictional engagement of the brake shoes against the friction plates, to thereby reduce thermal stresses. For example, as disclosed in United States Patent No. 2,800,982 issued July 30, 1957, to R. B. Cottrell, a one-piece cast iron brake rotor may comprise a brake ring connected to a hub by means of a bell-shaped web formed and arranged to circulate cooling air around one friction plate and to conduct heat from a companion friction plate.

While cast iron brake rotors of the type disclosed in the above-mentioned patent are relatively simple and inexpensive to manufacture, it is apparent that thermal stresses will result during braking operations due to expansion and contraction of the brake ring relative to the bell-shaped web and hub. As brake rotors of cast iron, having graphite in flake form, are low in tensile strength and have practically no ductility, the brake ring tends to grow during repeated heating and cooling cycles due to volume change in the material and thereby produces increasing tensile stresses within the brake ring and bell-shaped web.

As such stresses might eventually exceed the tensile strength of the material and cause fracture and loss of rotor material, it is an object of the present invention to provide a brake rotor having greater tensile strength and ductility than conventional cast iron rotors to thereby materially increase the useful life of the rotor.

Another object of the invention resides in the provision of a ductile cast iron rotor having the graphite in substantially spherical shape and substantially free of flake graphite to thereby materially increase the tensile strength of the metal and prevent fracture and loss of rotor material during repeated heated and cooling cycles.

A further object of the invention resides in the provision of an annealed ductile cast iron brake rotor having a tensile strength of about three times that of conventional cast iron rotors and ductility approaching that of cast steel to provide a greater margin of safety during use of the rotor in service.

Another object of the invention resides in the provision of a ductile cast iron brake rotor in which the friction surfaces are equal to conventional cast iron friction surfaces in wear and performance and materially better than the friction surfaces of cast steel rotors.

The invention embodies other novel features, details of construction and arrangement of parts which are hereinafter set forth in the specification and claims and illustrated in the accompanying drawings, forming part thereof, wherein:

FIGURE 1 is a front elevation illustrating an annealed ductile cast iron brake rotor, only one-half of the rotor being shown.

FIGURE 2 is a side elevation of the rotor.

FIGURE 3 is a section taken along the line 3—3 of FIGURE 1.

Referring now to the drawings for a better understanding of the invention, the brake rotor is shown in the form of a one-piece iron casting comprising a brake ring 2 interconnected to a hub 3 by a bell-shaped web 4. The brake ring is shown as comprising axially spaced annular inner and outer friction plates 6 and 7 interconnected by circumferentially spaced radial ribs 8 to define air passages 9. The remote sides of the friction plates 6 and 7 present flat annular parallel friction surfaces 11 and 12, respectively, adapted for frictional engagement by a pair of conventional friction shoes to decelerate rotation movement of the rotor.

The hub 3 is formed with a plurality of apertures 13 to receive cap screws for securing the rotor to the inner side of a railway car wheel 14. The web 4 extends from the hub 3 to merge with the inner friction plate 6 to define an annular passageway 16 between the outer friction plate 7 and the wheel for the passage of cooling air into the passages 9 in the brake ring to dissipate heat from the friction plates.

To provide a relatively inexpensive brake rotor having the desired physical properties for satisfactory long life service on railway cars, the rotor is cast in one piece of cast iron having approximately the following chemical composition: total carbon, 3.25–3.75%; silicon, 2.00–2.60%; manganese, .20–.60%; phosphorous, 0.16% maximum; sulphur, .02% maximum; nickel, .50–1.50%; copper, .10–.50%.

The cast iron rotor is then heated in a furnace to a temperature of 1650° F., held for two hours, then cooled at a rate of 50° F. per hour to a temperature of 1200° F., and then removed from the oven for cooling to room temperature to thereby produce an annealed ductile iron casting having a ferritic structure and approximately the following physical properties:

Tensile strength, minimum, p.s.i.—60,000
Yield strength, minimum p.s.i.—45,000
Elongation in 2 inches, minimum, percent—15

During repeated heating and cooling cycles of brake rotors in service, a conventional cast iron tends to grow to produce a volume change and increasing tensile stresses in the rotor friction faces and at the juncture of the friction plate 6 and the web 4, and it has been found that these stresses eventually exceed the tensile strength of the material and cause fracture and loss of rotor material.

As a brake rotor formed of ductile iron of the annealed type having spherical graphite grows at a rate only one-tenth as much as flake graphite under the same conditions of heating and cooling, the material is subjected to reduced tensile stresses. Due to the much higher available tensile strength of ductile iron, the rotor material is not subjected to tensile stresses exceeding the tensile strength of the material and, therefore, the rotor does not fracture and lose rotor material during its useful life.

It is also important to form a rotor of material providing friction surfaces suitable for engagement with existing brake lining material to reduce wear of the lining material and the rotor friction surfaces. While rotors have been formed of cast steel having greater strength than cast iron, they have not proven to be as efficient as ductile iron in service due to rapid wear of the brake lining and rotor friction surfaces.

I claim:
1. A brake rotor made from ductile iron containing total carbon, 3.25–3.75%; silicon, 2.00–2.60%; maganese .20–.60%; phosphorous, .16% maximum; sulphur, .02% maximum; nickel, .50–1.50%; copper, .10–.50%.

2. In a one-piece brake rotor in which a brake ring is interconnected to a hub by a bell-shaped web, said rotor comprising ductile iron containing total carbon, 3.25–3.75%; silicon, 2.00–2.60%; manganese, .20–.60%; phosphorous, .16% maximum; sulphur, .02% maximum; nickel, .50–1.50%; copper, .10–50%.

3. In a one-piece brake rotor having a hub and a bell-shaped web supporting spaced annular friction plates interconnected by radial ribs, having a relatively low rate of growth whereby the tensile strength of the material is not exceed during repeated heating and cooling cycles of the rotor in service, said rotor comprising ductile iron containing total carbon, 3.25–3.75%; silicon 2.00–2.60%; manganese, .20–.60%; phosphorous, .16% maximum; sulphur, .02% maximum; nickel, .05–1.50%; copper, .10–.50%.

References Cited in the file of this patent

UNITED STATES PATENTS 2,775,322    Bachman _____ Dec. 25, 1956

UNITED STATES PATENT OFFICE
CERTIFICATE OF CORRECTION

Patent No. 3,120,882                      February 11, 1964

Bernard Maloney

It is hereby certified that error appears in the above numbered patent requiring correction and that the said Letters Patent should read as corrected below.

Column 2, line 44, strike out "a"; column 4, line 1, for "exceed" read -- exceeded --; same column 4, line 5, for ".05-1.50%;" read -- .50-1.50%; --.

Signed and sealed this 30th day of June 1964.

(SEAL)
Attest:

ERNEST W. SWIDER
Attesting Officer

EDWARD J. BRENNER
Commissioner of Patents